(12) United States Patent
Kanade et al.

(10) Patent No.: US 8,265,036 B2
(45) Date of Patent: Sep. 11, 2012

(54) APPARATUS AND METHOD FOR A CENTRALLY MANAGED HANDOFF BETWEEN TWO TECHNOLOGIES

(75) Inventors: Parag Mohan Kanade, San Diego, CA (US); Reza Shahidi, San Diego, CA (US); Deepak Khandelwal, San Diego, CA (US); Stephanie A. Brelsford, San Diego, CA (US); Bao V. Nguyen, Corona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 12/497,172

(22) Filed: Jul. 2, 2009

(65) Prior Publication Data

US 2011/0003593 A1 Jan. 6, 2011

(51) Int. Cl.
*H04W 4/00* (2009.01)
(52) U.S. Cl. .................................. 370/331; 455/436
(58) Field of Classification Search .................. 370/331, 370/338, 342, 328, 332, 333, 335, 310.2, 370/319, 322, 329, 321; 455/437, 436, 432.1
See application file for complete search history.

(56) References Cited

U.S. PATENT DOCUMENTS

| 7,574,212 | B2 * | 8/2009 | McConnell et al. | 455/437 |
| 7,603,119 | B1 * | 10/2009 | Durig et al. | 455/432.3 |
| 7,787,421 | B2 * | 8/2010 | Ramanna et al. | 370/331 |
| 2006/0126564 | A1 | 6/2006 | Ramanna et al. | |
| 2009/0111471 | A1 | 4/2009 | Li et al. | |

FOREIGN PATENT DOCUMENTS

| EP | 1973368 A2 | 9/2008 |
| EP | 2007161 A1 | 12/2008 |
| WO | WO0038465 A1 | 6/2000 |

OTHER PUBLICATIONS

International Search Report and Written Opinion—PCT/US2010/040963, International Search Authority—European Patent Office—Dec. 28, 2010.

* cited by examiner

*Primary Examiner* — Chi Pham
*Assistant Examiner* — Alexander O Boakye
(74) *Attorney, Agent, or Firm* — Darren M. Simon

(57) ABSTRACT

An apparatus and method for a centrally managed handoff comprising originating a service using a first technology and connecting the service using the first technology; activating a second technology that is different from the first technology; receiving a first request for the handoff from the first technology to the second technology; sending a second request for the handoff from the first technology to the second technology, wherein the second request relates to the first request; receiving an acknowledgement that the second technology is available; implementing the handoff from the first technology to the second technology; and determining that the handoff is successfully implemented before terminating the first technology.

20 Claims, 8 Drawing Sheets

APPARATUS AND METHOD FOR A CENTRALLY MANAGED HANDOFF BETWEEN TWO TECHNOLOGIES

FIELD

This disclosure relates generally to apparatus and methods for inter-technology handoff. More particularly, the disclosure relates to inter-technology handoff for wireless systems.

BACKGROUND

In current wireless networks, multiple wireless technologies are available to a mobile user. For example, a higher data rate service may be available to the mobile user at the center of a large urban area, but not necessarily available at the edge of the large urban area or in suburban areas. In this case, as the mobile user moves from the center of the large urban area towards the edge or towards the suburban areas, the wireless terminal will require a handoff between different technologies (e.g., 1X wireless systems and 1X-EVDO (evolution data optimized) rev. A wireless systems). Without the handoff, the wireless calls of the wireless terminal will be dropped as the mobile user leaves the higher data rate service coverage area. Dropped calls are a major cause of dissatisfaction for mobile users.

In one example of inter-technologies, 1X wireless systems provide ubiquitous coverage while 1X-EVDO rev. A wireless systems are not yet widely deployed. 1X-EVDO rev. A wireless systems are optimized for widespread packet data coverage at a higher data rate than the baseline 1X wireless systems. Voice over Internet Protocol (VoIP) calls on 1X-EVDO need to be handed off to a 1X wireless system at the edge of the coverage of the 1X-EVDO wireless system. In general, at the edge of the coverage of one technology towards the coverage of another technology, handoff is needed. For example, handoffs are required between Universal Mobile Telecommunications (UMTS) and 1X wireless systems, between wireless Local Area Network (LAN) and 1X wireless systems, and between wireless LAN and Global System for Mobile/Universal Mobile Telecommunications System (GSM/UMTS) systems, etc.

SUMMARY

Disclosed is an apparatus and method for inter-technology handoff for wireless systems. According to one aspect, a method for a centrally managed handoff comprising originating a service using a first technology and connecting the service using the first technology; activating a second technology that is different from the first technology; receiving a first request for the handoff from the first technology to the second technology; sending a second request for the handoff from the first technology to the second technology, wherein the second request relates to the first request; receiving an acknowledgement that the second technology is available; implementing the handoff from the first technology to the second technology; and determining that the handoff is successfully implemented before terminating the first technology.

According to another aspect, a central entity for facilitating a handoff between a first technology and a second technology comprising means for originating a service using a first technology and connecting the service using the first technology; means for activating a second technology that is different from the first technology; means for receiving a first request for the handoff from the first technology to the second technology; means for sending a second request for the handoff from the first technology to the second technology, wherein the second request relates to the first request; means for receiving an acknowledgement that the second technology is available; means for implementing the handoff from the first technology to the second technology; and means for determining that the handoff is successfully implemented before terminating the first technology.

According to another aspect, a central entity for performing a handoff comprising at least one processor coupled to at least one memory, the at least one memory containing program code executable by the at least one processor for performing the following: originating a service using a first technology and connecting the service using the first technology; activating a second technology that is different from the first technology; receiving a first request for the handoff from the first technology to the second technology; sending a second request for the handoff from the first technology to the second technology, wherein the second request relates to the first request; arbitrating access to the second technology and determining that the second technology is available; implementing the handoff from the first technology to the second technology; and determining that the handoff is successfully implemented before terminating the first technology.

According to another aspect, a computer-readable medium having a computer program comprising instructions, which when executed by at least one processor, operates to centrally manage an inter-technology handoff, the computer program comprising: instructions for originating a service using a first technology and connecting the service using the first technology; instructions for activating a second technology that is different from the first technology; instructions for receiving a first request for the handoff from the first technology to the second technology; instructions for sending a second request for the handoff from the first technology to the second technology, wherein the second request relates to the first request; instructions for receiving an acknowledgement that the second technology is available; instructions for implementing the handoff from the first technology to the second technology; and instructions for determining that the handoff is successfully implemented before terminating the first technology.

The advantages of the present disclosure include a central entity which coordinates handoffs between different technologies to ensure that the existing service (i.e., the first technology) is not terminated until it has been verified that a successful handoff to a new service (i.e., the second technology) has been achieved. The central entity facilitates inter-technology handoff by activating and deactivating different technologies as required to ensure continuing service without loss of coverage. The required technology is activated in the correct state. The central entity transfers signaling messages between the different technologies and arbitrates access for shared resources as needed. And, the central entity manages the calls for the handoff. The central entity provides coordination between handoffs between services, resulting in a smoother transition to the new service before terminating the existing service; thus, decreasing call drops.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
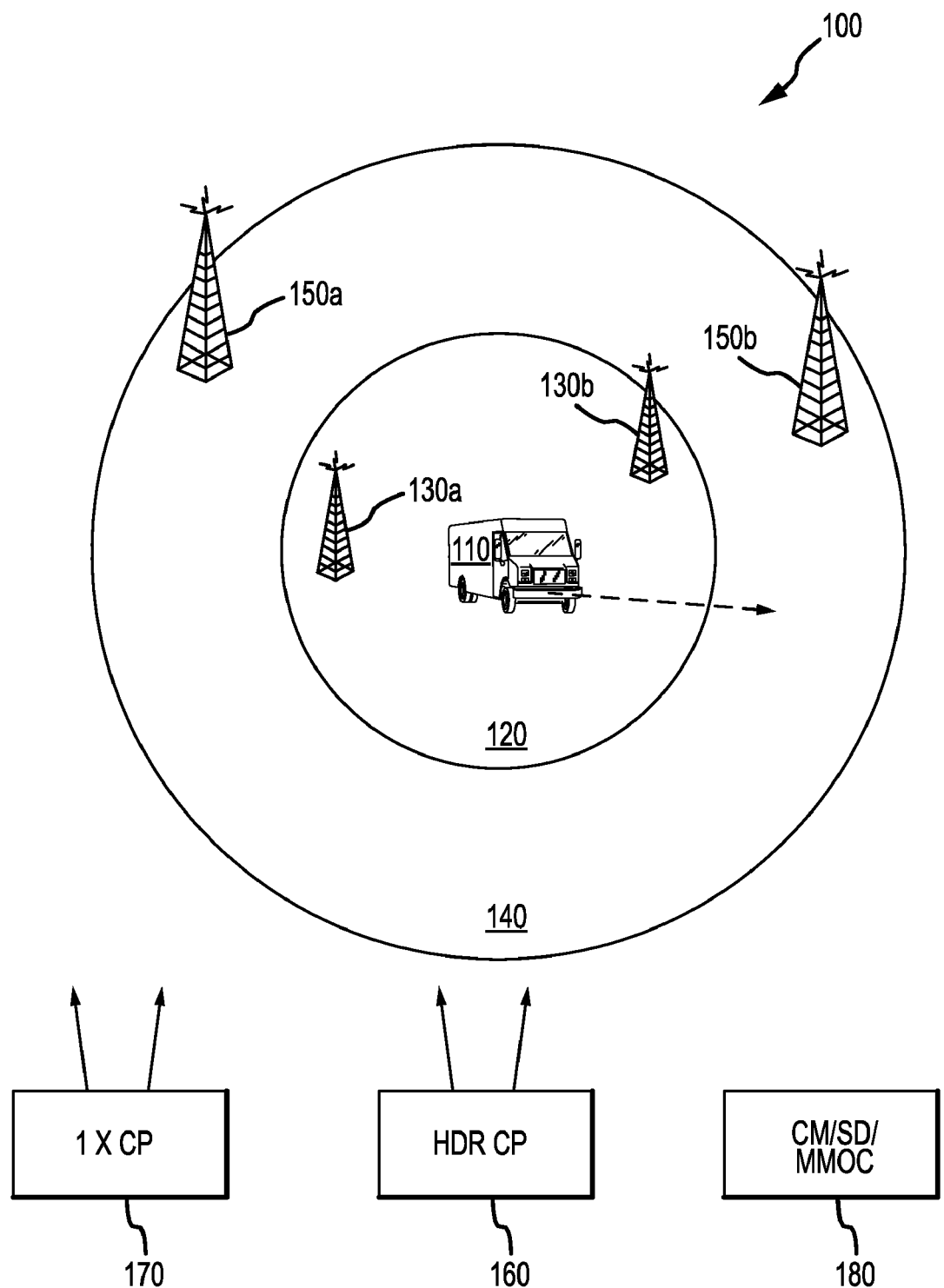
FIG. 1 illustrates an example of a centrally managed handoff between two technologies of a mobile terminal.

FIG. 1 illustrates an example 100 of a centrally managed handoff between two technologies of a mobile terminal 110. The mobile terminal 110 is located within a high data rate (HDR) coverage area 120 shown with two EVDO access nodes 130a, 130b. One skilled in the art would understand that the quantity of EVDO access nodes is dependent on the coverage area size, design choice and other various factors and thus, can be different than two without affecting the spirit and scope of the present disclosure. Surrounding the HDR coverage area 120 is a 1X coverage area 140 with two 1X access nodes 150a, 150b. Calls within the HDR coverage area 120 are managed by a CDMA High Data Rate Call Processing (HDR CP) 160. The CDMA HDR CP is also known as a CDMA Evolution Data Optimized Call Processing (EVDO CP). Calls within the 1X coverage area 140 are managed by a 1X Call Processing (1X CP) 170. In one aspect, 1X CP is a task responsible for CDMA protocol related signaling. A Handoff Manager (HOMER), which in one aspect, comprises a Call Manager/System Determination/Multimode Controller (CM/SD/MMOC) 180 manages the handoff between inter-technologies such as a handoff occurring from the HDR coverage area 120 to the 1X coverage area 140. In one aspect, CM is responsible for the call management for all technologies (e.g., CDMA, 1X EVDO, GSM, UMTS, WLAN, etc.); SD is responsible for system selection, enabling the user equipment (UE) to automatically choose the best network which can provide service; and MMOC is responsible for turning on/off the protocol stacks. One skilled in the art would understand that the specifics of 1X and HDR technologies are used in FIG. 1 as examples, and that 1X can be substituted with any suitable first wireless technology, HDR can be substituted with any suitable second wireless technology and the CM/SD/MMOC can be substituted with a handoff manager (e.g., HOMER) without affecting the scope or spirit of the present disclosure.

Figure 2:
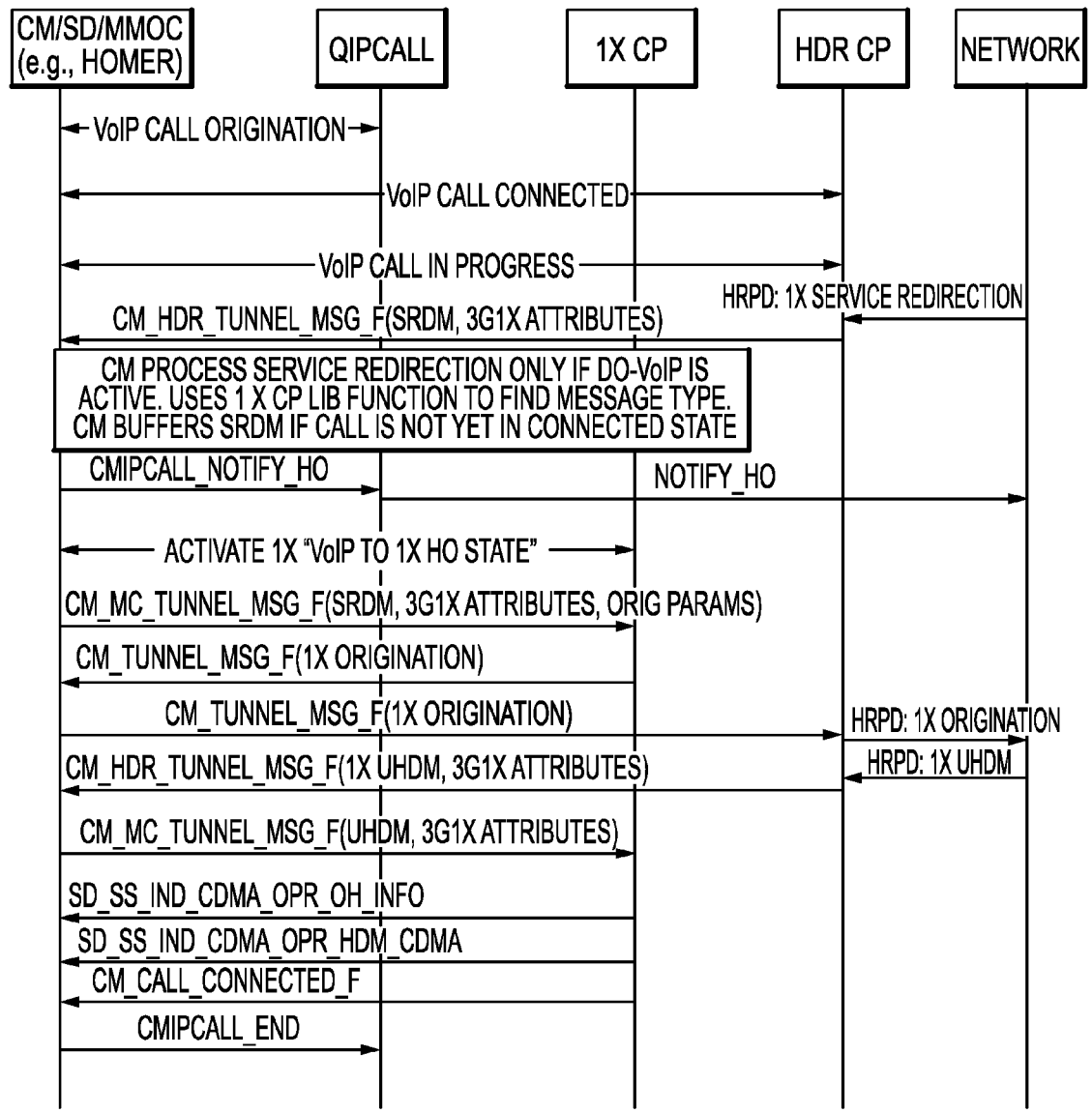
FIG. 2 illustrates an example call flow diagram for a centrally managed handoff between two technologies, in particular from a VoIP on 1X-EVDO rev. A wireless system to a 1X wireless system.

FIG. 2 illustrates an example call flow diagram for a centrally managed handoff between two technologies, in particular from a VoIP on 1X-EVDO rev. A wireless system to a 1X wireless system. In this case, the 1X wireless system is associated with the 1X coverage area 140 and the 1X-EVDO rev. A wireless system is associated with the HDR coverage area 120. Referring to FIG. 2, there are three parts to the handoff: 1) VoIP Call Origination; 2) Call Manager (CM) processing of service redirection messages (SRDMs); and 3) CM processing of universal handoff direction messages (UHDMs) which are described below.

VoIP Call Origination

As shown in FIG. 2, the Call Manager (CM) receives a VoIP call origination message and originates the call within the HDR coverage area 120. In one aspect, the CM is a processor coupled to a memory with program codes executable by the processor for managing calls such as voice calls. Upon receiving a call-connected indication, the CM attempts to bring up 1X CP (which is part of the 1X wireless system). The CM follows the normal 1X CP power-up acquisition order to acquire the 1X service. In one example, the acquisition step is to go through the Preferred Roaming List (PRL) several times (e.g., N1 times), and if 1X CP still fails to be acquired, then the 1X CP is put in an inactive state for a period of time (e.g., T1 seconds). If necessary, repeat the acquisition step for the entire duration of VoIP call. In one aspect, the PRL is a database within the mobile terminal 110. The PRL includes information used during the mobile terminal selection and acquisition process. One skilled in the art would understand that the quantity of N1 and T1 may be chosen based on system design and/or application choice. When the CM receives a tunneled message from the HDR CP, it checks the message id (as provided by caix_get_message_id_of_tunneled_msg) to determine how to proceed. The CM will drop all tunneled messages from the HDR CP except for service redirection messages (SRDMs) and universal handoff direction messages (UHDMs). The CM will only send tunneled messages from the HDR CP to the 1X CP when there is a VOIP call in progress. The CM will not send a tunneled UHDM to the 1X CP until the CM has received a tunneled message from the 1X CP to the HDR CP. The CM does not know that a payload of the tunneled message is an origination.

CM Processing of SRDM

The 1X origination message is created by 1X CP in response to the SRDM. The SRDM is returned via CM_TUN- NEL_MSG_F. If there is an Origination failure, the 1X CP will send an origination failure indication (CM_CALL_ORIG_FAIL_F) to the CM. In response, the CM will stop sending the SIP NOTIFY when it receives the origination failure indication. When the CM receives an SRDM, it drops subsequent SRDMs until it receives a response from the 1X CP, either CM_TUNNEL_MSG_F or CM_CALL_ORIG_FAIL_F. However, the CM will not buffer or drop any other commands while it is waiting for a response to the SRDM. When the 1X CP is finished processing the SRDM, the 1X CP will continue processing commands on the mc_c-md_q. Since the 1X CP does not process commands from its queue while it is creating the call origination message, the CM can send commands to the 1X CP during this time.

If the CM receives an origination failure indication from the 1X CP, the CM will proceed as if the initial SRDM was never received. The CM will not drop SRDMs received from that point onward. This allows the handoff to be initiated again, provided the cause of the failure is fixed, for example, by the base station (a.k.a. access node).

If the CM receives an origination message, the CM will drop all SRDMs received from that point onward. The HDR CP relays the origination message to the base station (a.k.a. access node). Since duplicate detection in inactive state is not being performed, it is difficult to know if a newly received SRDM is a duplicate. The mobile terminal is expecting to receive a UHDM and processing the origination message is time consuming if the mobile terminal is waiting for an Authentication Signature. It would not be feasible to delay processing the UHDM in order to send another origination message.

If the 1X CP is in an inactive state when the SRDM is received, the CM will activate the 1X CP and send the SRDM to the 1X CP. The 1X CP packs an origination message and sends it to the CM. If the CM receives the UHDM, the CM will pass the UHDM to the 1X CP.

CM Processing of UHDM

The 1X CP monitors its command queue while it is processing the UHDM. In some instances, the 1X CP is not in its correct state to process most commands. After sending the UHDM, the CM will either buffer or drop all other commands, as appropriate. The CM will also drop all tunneled messages. The CM will resume sending commands when it either receives a call connect, or an error (such as fade or origination failure indication).

Figure 3:
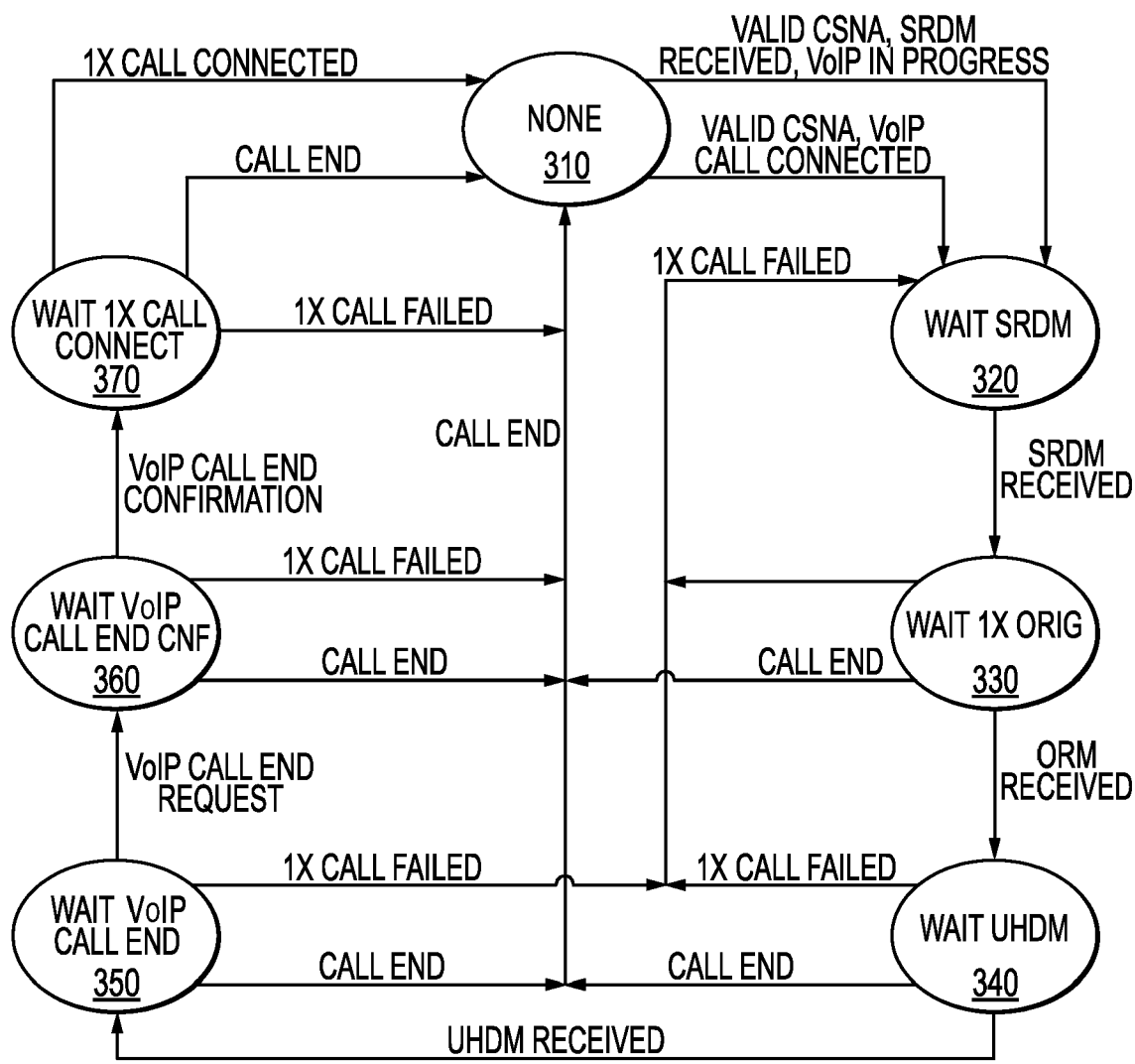
FIG. 3 illustrates an example state transition diagram for a centrally managed handoff of VoIP between two technologies, in particular from a VoIP on 1X-EVDO rev. A wireless system to a 1X wireless system.

FIG. 3 illustrates an example state transition diagram 300 for a centrally managed handoff of VoIP between two technologies, in particular from a VoIP on 1X-EVDO rev. A wireless system to a 1X wireless system. In state 310, a valid circuit service notification application (CSNA) and/or a valid service redirection message (SRDM) are received while a VoIP call is in progress or connected. The handoff manager (labeled here as HOMER for HandOff ManagER) is the central entity which coordinates the handoff between the two different technologies. In State 320, HOMER waits for a SRDM. When a SRDM is received, proceed to State 330 where HOMER waits for a 1X origination message. The 1X origination message is the origination message for a call associated with the 1X wireless system. In one case, the call ends and thus, proceed to State 310. In one case, if the 1X call fails, proceed back to State 320. When the 1X origination message is received, proceed to State 340 where HOMER waits for a UHDM. Again, if the 1X call fails, proceed back to State 320. If the call ends, proceed to State 310. When the UHDM is received, proceed to State 350 where HOMER waits for the VoIP call end request. If the 1X call fails, proceed back to State 320. If the call ends, proceed to State 310. When the VoIP call end request is received, proceed to State 360 where HOMER waits for a VoIP call end confirmation (CNF). If the 1X call fails or if the call ends, proceed to State 310. Once the VoIP call end confirmation is received, proceed to State 370 where HOMER waits for a 1X call connection. If the 1X call fails or if the call ends, proceed to State 310. If the 1X call is connected, also proceed to State 310.

As shown in FIG. 3, HOMER facilitates handoff between inter-technologies by activating and deactivation different technologies as required. The required technology is activated in the correct state for use. HOMER transfers signaling messages between the different technologies and arbitrates access for shared resources. HOMER manages the calls for the handoff.

As shown in FIG. 3, the central entity (i.e., HOMER) supports handing off 1X EVDO VoIP calls to 1X voice calls. However, one skilled in the art would understand that other technologies can be substituted without affecting the scope and spirit of the present disclosure. For example, the central entity can also support UMTS to 1X voice call handoffs, wireless LAN VoIP calls to 1X voice calls, wireless LAN VoIP calls to GSM/UMTS call, etc.

Figure 4:
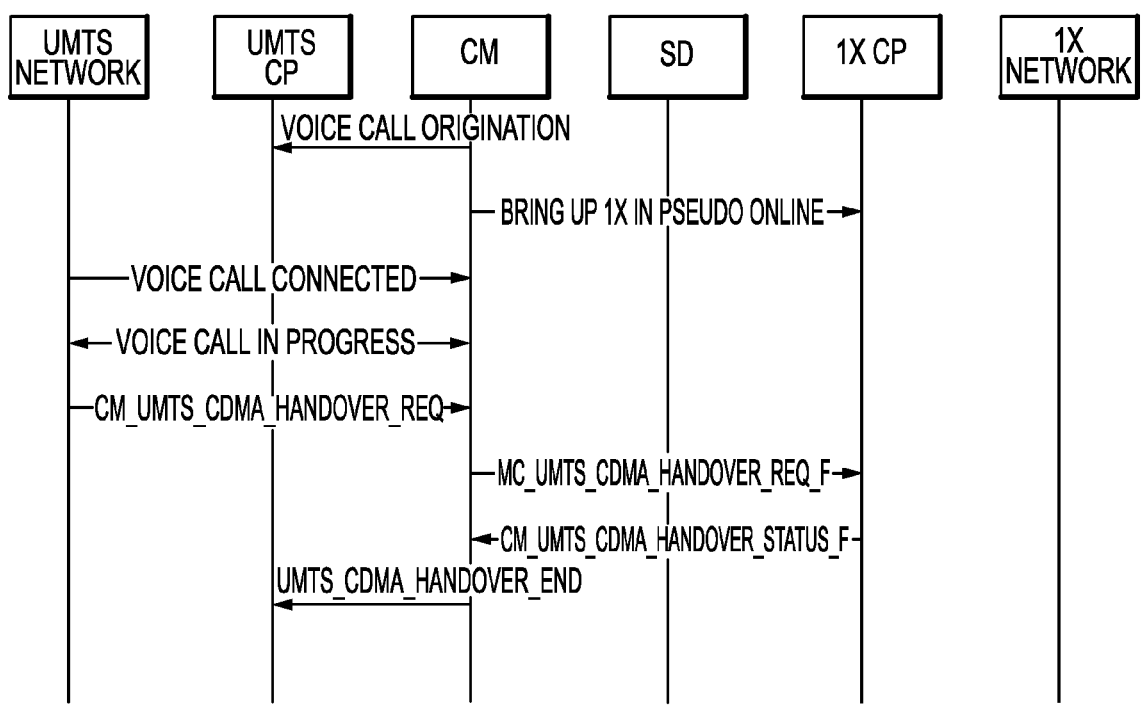
FIG. 4 illustrates an example call flow diagram for a centrally managed handoff from voice on UMTS to a 1X wireless system.

FIG. 4 illustrates an example call flow diagram for a centrally managed handoff from voice on UMTS to a 1X wireless system. The UMTS CP receives a voice call origination message from the CM. The CM then brings up the 1X CP. The voice call is connected by the UMTS network and the voice call is in progress. Subsequently, the CM receives a handover request (CM_UMTS_CDMA_HANDOVER_REQ) from the UMTS network. The CM then sends a handover request message (MC_UMTS_CDMA_HANDOVER_REQ_F) to the 1X CP and receives a handover status (CM_UMTS_CDMA_HANDOVER_STATUS_F) from the 1X CP. Finally the CM ends the handover by sending a handover end message (UMTS_CDMA_HANDOVER_END) to the UMTS CP.

Figure 5:
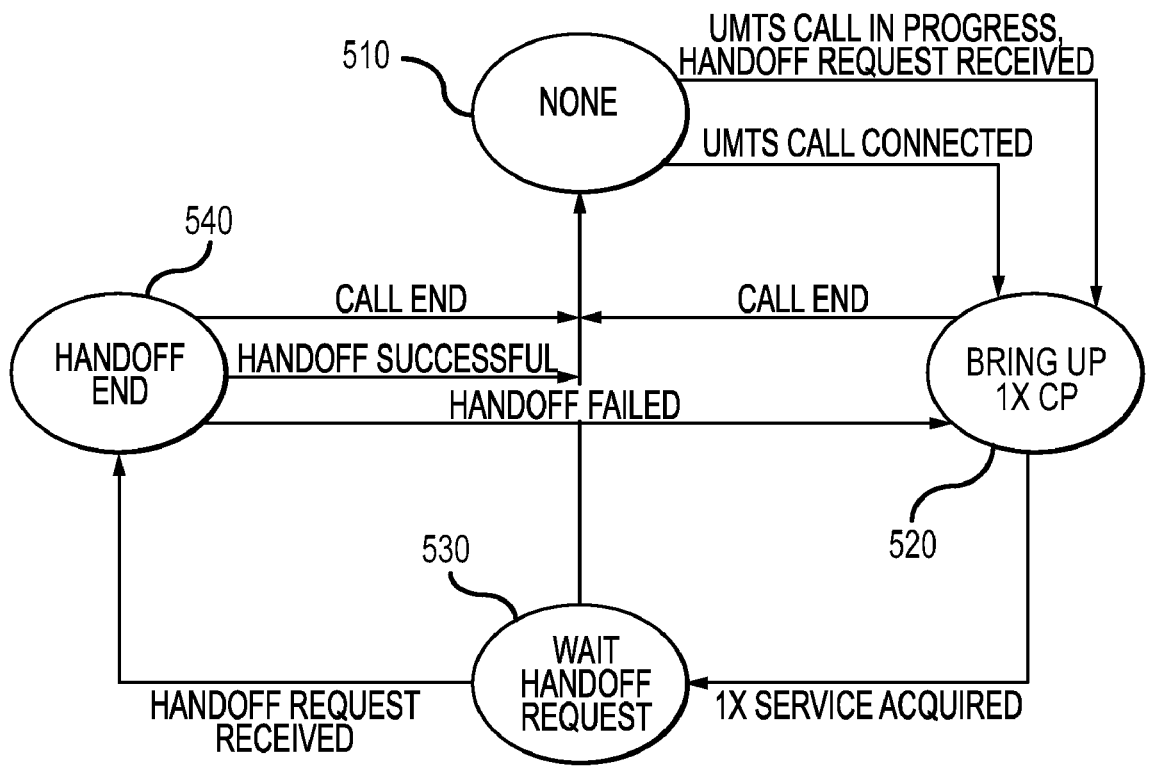
FIG. 5 illustrates an example state transition diagram for a centrally managed handoff from voice on UMTS to a 1X wireless system.

Corresponding to FIG. 4 is FIG. 5. FIG. 5 illustrates an example state transition diagram for a centrally managed handoff from voice on UMTS to a 1X wireless system. In State 510, if a UMTS call is in progress (i.e., connected) proceed to State 520. If a handoff request is received from the UMTS, proceed to State 520. In State 520, the central entity (labeled as HOMER) attempts to bring up 1X CP (which is part of the 1X wireless system). If the call ends, proceed back to State 510. If the 1X service is acquired, proceed to State 530 and wait for a handoff request from the CM to the 1X CP. If the call ends or if the handoff request is not received after a preset amount of waiting time, proceed to block 510. When the handoff request from the CM to the 1X CP is received, proceed to State 540. In State 540, if the call ends or if the handoff is successful, process back to State 510. If the handoff failed, proceed back to State 520.

In conventional handoff procedures, the sequential steps of receiving a handoff request, ending the existing service and activating a new service for handoff often causes discontinuity during a call in progress in the event activating the new service takes longer than anticipated. For example, once a request for handoff is received, the existing service is dropped as handoff to a new service is being implemented. Successful connection to the new service may not yet be ensured when the existing service is terminated. Thus, a call in progress may be dropped.

Figure 6:
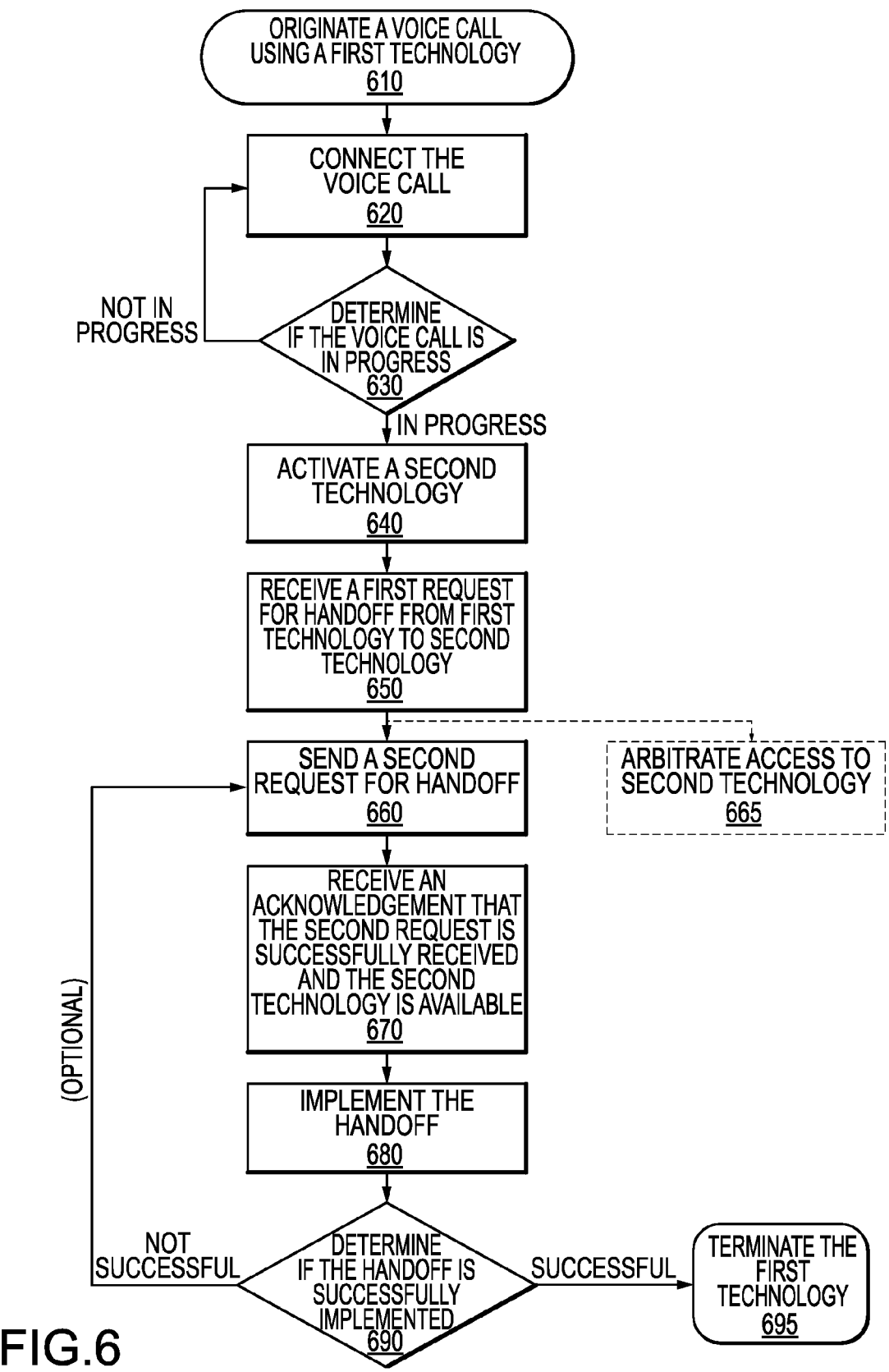
FIG. 6 illustrates an example flow diagram for a centrally managed handoff between two technologies while minimizing dropped calls in progress.

FIG. 6 illustrates an example flow diagram for a centrally managed handoff between two technologies while minimizing dropped calls in progress. In block 610, originate a service (e.g., voice call) using a first technology. In one aspect, the service is originated by the CM to a call processor of the first technology. Examples of the first technology include 1X, 1X-EVDO VoIP, UMTS, wireless LAN VoIP, GSM/UMTS, WiMax, Long Term Evolution (LTE) technologies, etc. Once the service is originated, connect the service using the first technology in block 620. In block 630, determine if the service is in progress. If the service is not in progress, proceed back to block 620 to reconnect the service. If the service is in progress, proceed to block 640 and activate a second technology. Examples of the second technology include 1X, 1X-EVDO VoIP, UMTS, wireless LAN VoIP, GSM/UMTS, WiMax, Long Term Evolution (LTE) technologies, etc. However, the second technology is always different than the first technology for a particular service. One skilled in the art would understand that the examples of first and second technologies listed here are given only as examples and are not meant to exclude other technologies not herein mentioned. In one aspect, the service is connected by the CM, and the CM checks the service progress and activates the second technology. In one aspect, activating the second technology also includes receiving an origination message to indicate that the activation is successful.

Following block 640, in block 650, receive a first request for handoff from the first technology to the second technology. In block 660, send a second request for handoff wherein the second request relates to the first request. In one aspect, the first request and the second request are the same. In another aspect, the first request is a SRDM and the second request is a UHDM wherein the first technology is a 1X EVDO technology, and the second technology is a 1X technology. In block 665, arbitrate access to the second technology. Arbitrating access to the second technology may also include determining that the second technology is available. This step is an option that may or may not be exercised depending on the particular application and/or need.

In one aspect, the first request for handoff is sent by the call processor of the first technology and received by the CM. The CM then sends a second request for handoff to a call processor of the second technology. In one option, the CM arbitrates access to the second technology. Following block 660, in block 670, receive an acknowledgement that the second request is successfully received. And, in one aspect, receive acknowledgement that the second technology is available for handoff. In one aspect, the call processor of the second technology acknowledges receipt of the second request for handoff and the acknowledgement is sent to and received by the CM.

In block 680, implement the handoff from the first technology to the second technology. Determine if the handoff is successfully implemented in block 690. And, if the handoff is not successful, an option to proceed back to block 660 may be taken. But, if the handoff to the second technology is successful, then proceed to block 695 to terminate the first technology. At this point, the handoff procedure is ended. In one aspect, the call processor of the second technology implements the handoff request for the second technology. The CM then determines if the handoff is successfully implemented.

Although FIGS. 2, 3, 4, 5 and 6 are illustrated using voice calls/VoIP as examples, one skilled in the art would understand that the diagrams of FIGS. 2, 3, 4, 5 and 6 are applicable to all services (such as, but not limited to, voice calls, VoIP, short messaging service (SMS), text, e-mail, data call, image, video, broadcast service, etc.).

One skilled in the art would understand that the techniques described herein may be implemented by various ways. For example, the techniques may be implemented in hardware, software or a combination thereof. For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit.

Figure 7:
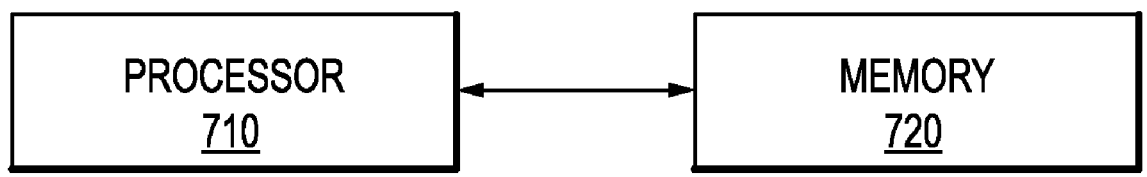
FIG. 7 illustrates an example device which comprises at least one processor in communication with at least one memory for executing a centrally managed handoff process between two technologies while minimizing dropped calls in progress.

The various illustrative flow diagrams, state transition diagrams, logical blocks, and/or modules described herein may be implemented or performed with one or more processors. In one aspect, a processor is coupled with a memory which stores data, meta data, program instructions, etc. to be executed by the processor for implementing or performing the various flow diagrams, state transition diagrams, logical blocks and/or modules described herein. FIG. 7 illustrates an example device 700 which comprises at least one processor 710 in communication with at least one memory 720 for executing a centrally managed handoff process between two technologies while minimizing dropped calls in progress as described herein. For example, the device 700 is used to implement any one of the algorithms illustrated in FIGS. 2-6. One skilled in the art would understand that there are many choices for the implementation of the at least one memory 720 and the at least one processor 710. They can be co-located or not depending on the design choice and the particular application.

Figure 8:
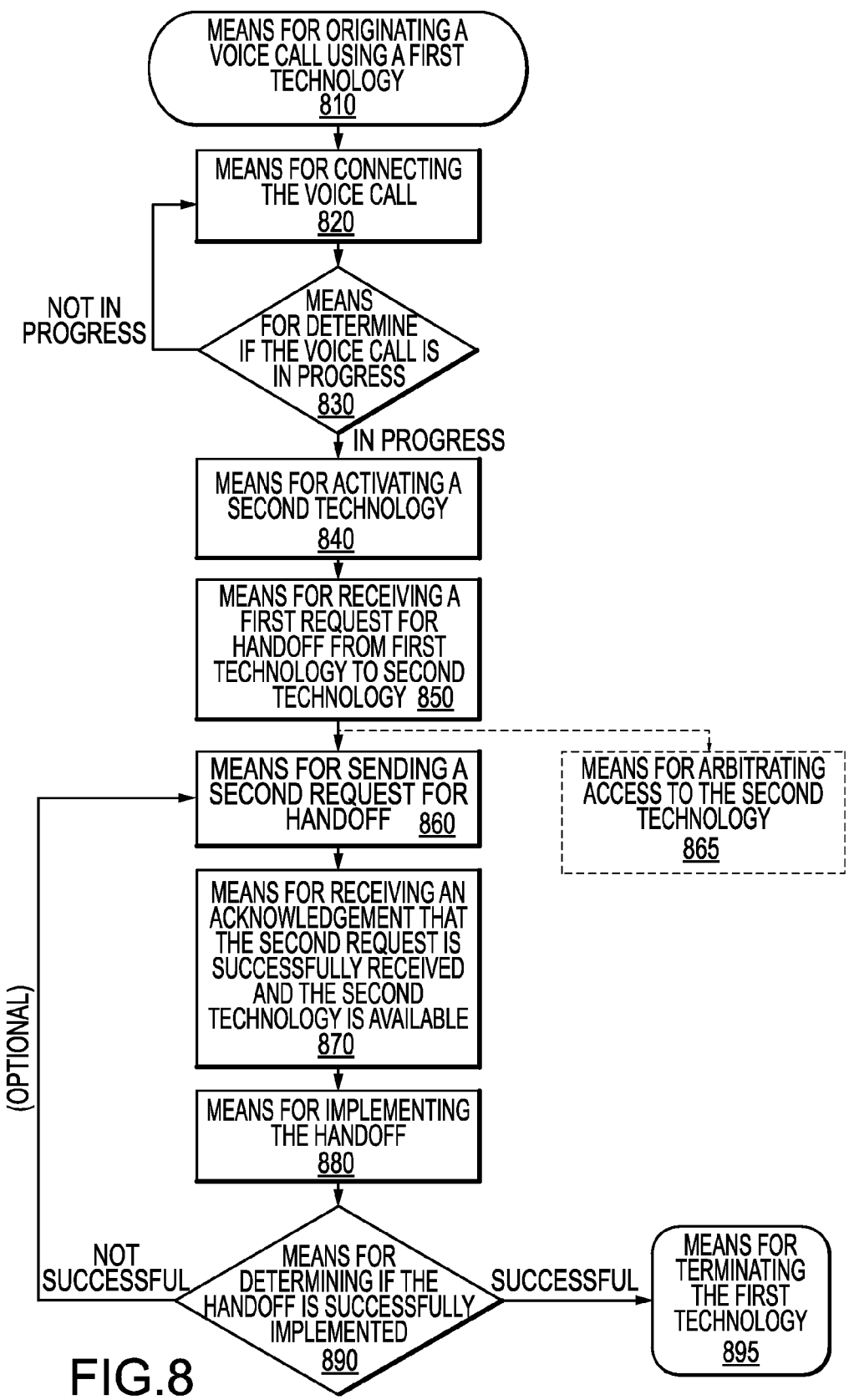
FIG. 8 illustrates an example device suitable for executing a centrally managed handoff process between two technologies while minimizing dropped calls in progress.

FIG. 8 illustrates an example device 800 suitable for executing a centrally managed handoff process between two technologies while minimizing dropped calls in progress. In one aspect, the device 800 is implemented by at least one processor comprising one or more modules configured to provide different aspects of inter-technology handoff as described herein in blocks 810, 820, 830, 840, 850, 860, 865, 870, 880, 890 and 895. For example, each module comprises hardware, software, or any combination thereof. In one aspect, the device 900 is also implemented by at least one memory in communication with the at least one processor.

A processor may be a general purpose processor, such as a microprocessor, a specific application processor, such as a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof.

One skilled in the art would understand that the techniques described herein may also be coded as computer-readable instructions carried on any computer-readable medium known in the art. In this specification and the appended claims, the term "computer-readable medium" refers to any medium that participates in providing instructions to any processor for execution. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method executable by a central entity for a centrally managed handoff comprising:
   originating a service using a first technology and connecting the service using the first technology;
   activating a second technology that is different from the first technology;
   receiving, at the central entity, a first request for the handoff from the first technology to the second technology;
   sending, from the central entity, a second request for the handoff from the first technology to the second technology, wherein the second request relates to the first request;
   receiving an acknowledgement that the second technology is available;
   implementing the handoff from the first technology to the second technology; and
   determining that the handoff is successfully implemented before terminating the first technology.

2. The method of claim 1 further comprising arbitrating access to the second technology.

3. The method of claim 2, wherein the arbitrating comprises using a preferred roaming list (PRL).

4. The method of claim 2, wherein the activating includes receiving an origination message to indicate successful activation of the second technology.

5. The method of claim 1 further comprising determining if the service is in progress and reconnecting the service if the service is not in progress.

6. The method of claim 5 wherein the service is one of a voice call, VoIP, short messaging service (SMS), text, e-mail, data call, image, video or broadcast service.

7. The method of claim 1 wherein the first technology is one of 1X, 1X-EVDO VoIP, UMTS, wireless LAN VoIP, GSM/UMTS, WiMax, Long Term Evolution (LTE) technologies, and the second technology is one of 1X, 1X-EVDO VoIP, UMTS, wireless LAN VoIP, GSM/UMTS, WiMax, Long Term Evolution (LTE) technologies, wherein the first technology is not the same as the second technology.

8. The method of claim 1 wherein the first technology is a 1X EVDO technology and the second technology is a 1X technology.

9. The method of claim 8 wherein the first request for the handoff is a service redirection message (SRDM).

10. The method of claim 9 wherein the second request for the handoff is a universal handoff direction message (UHDM).

11. A central entity for facilitating a handoff between a first technology and a second technology comprising:
    means for originating a service using a first technology and connecting the service using the first technology;
    means for activating a second technology that is different from the first technology;
    means for receiving a first request for the handoff from the first technology to the second technology;
    means for sending a second request for the handoff from the first technology to the second technology, wherein the second request relates to the first request;
    means for receiving an acknowledgement that the second technology is available;
    means for implementing the handoff from the first technology to the second technology; and
    means for determining that the handoff is successfully implemented before terminating the first technology.

12. The central entity of claim 11 further comprising means for arbitrating access to the second technology.

13. The central entity of claim 12 further comprising means for using a preferred roaming list (PRL) when arbitrating access to the second technology.

14. The central entity of claim 11 wherein the service is one of a voice call, VoIP, short messaging service (SMS), text, e-mail, data call, image, video or broadcast service.

15. The central entity of claim 11 wherein the first technology is one of 1X, 1X-EVDO VoIP, UMTS, wireless LAN VoIP, GSM/UMTS, WiMax, Long Term Evolution (LTE) technologies, and the second technology is one of 1X, 1X-EVDO VoIP, UMTS, wireless LAN VoIP, GSM/UMTS, WiMax, Long Term Evolution (LTE) technologies, wherein the first technology is not the same as the second technology.

16. A central entity for performing a handoff comprising at least one processor coupled to at least one memory, the at least one memory containing program code executable by the at least one processor for performing the following:
    originating a service using a first technology and connecting the service using the first technology;
    activating a second technology that is different from the first technology;
    receiving a first request for the handoff from the first technology to the second technology;
    sending a second request for the handoff from the first technology to the second technology, wherein the second request relates to the first request;
    arbitrating access to the second technology and determining that the second technology is available;
    implementing the handoff from the first technology to the second technology; and
    determining that the handoff is successfully implemented before terminating the first technology.

17. The central entity of claim 16 wherein the service is one of a voice call, VoIP, short messaging service (SMS), text, e-mail, data call, image, video or broadcast service, and wherein the first technology is a 1X EVDO technology and the second technology is a 1X technology.

18. The central entity of claim 17, wherein the first request for the handoff is a service redirection message (SRDM) and the second request for the handoff is a universal handoff direction message (UHDM).

19. The central entity of claim 16 wherein the first technology is one of 1X, 1X-EVDO VoIP, UMTS, wireless LAN VoIP, GSM/UMTS, WiMax, Long Term Evolution (LTE) technologies, and the second technology is one of 1X, 1X-EVDO VoIP, UMTS, wireless LAN VoIP, GSM/UMTS, WiMax, Long Term Evolution (LTE) technologies, wherein the first technology is not the same as the second technology.

20. A non-transitory computer-readable medium having a computer program comprising instructions, which when executed by at least one processor, operates a central entity to centrally manage an inter-technology handoff, the computer program comprising:

- instructions for originating a service using a first technology and connecting the service using the first technology;
- instructions for activating a second technology that is different from the first technology;
- instructions for receiving a first request for the handoff from the first technology to the second technology;
- instructions for sending a second request for the handoff from the first technology to the second technology, wherein the second request relates to the first request;
- instructions for receiving an acknowledgement that the second technology is available;
- instructions for implementing the handoff from the first technology to the second technology; and
- instructions for determining that the handoff is successfully implemented before terminating the first technology.

* * * * *